(12) United States Patent
LaRocca et al.

(10) Patent No.: US 6,996,595 B2
(45) Date of Patent: Feb. 7, 2006

(54) APPARATUS AND METHOD FOR CONSOLIDATING OUTPUT DATA FROM A PLURALITY OF PROCESSORS

(75) Inventors: Judith LaRocca, Carlsbad, CA (US); Ann Chris Irvine, Bonsall, CA (US)

(73) Assignee: Qualcomm Incorporated, San Diego, CA (US)

( * ) Notice: Subject to any disclaimer, the term of this patent is extended or adjusted under 35 U.S.C. 154(b) by 897 days.

(21) Appl. No.: 09/881,221

(22) Filed: Jun. 13, 2001

(65) Prior Publication Data

US 2002/0176118 A1 Nov. 28, 2002

Related U.S. Application Data

(60) Provisional application No. 60/291,467, filed on May 16, 2001.

(51) Int. Cl.
*G06F 17/14* (2006.01)
(52) U.S. Cl. ........................... 708/400; 708/402
(58) Field of Classification Search ............... 708/400, 708/401, 402, 403, 404, 405, 406, 408, 409
See application file for complete search history.

(56) References Cited

U.S. PATENT DOCUMENTS

| | | | | |
|---|---|---|---|---|
| 3,754,128 A | * | 8/1973 | Corinthios | 708/400 |
| 4,791,598 A | * | 12/1988 | Liou et al. | 708/402 |
| 5,361,370 A | * | 11/1994 | Sprague et al. | 712/22 |
| 5,754,456 A | * | 5/1998 | Eitan et al. | 708/402 |
| 6,304,887 B1 | * | 10/2001 | Ju et al. | 708/404 |

* cited by examiner

*Primary Examiner*—Chuong D Ngo
(74) *Attorney, Agent, or Firm*—Phil Wadsworth; Sandip (Nicky) Minhas; Abdollah Katbab

(57) ABSTRACT

In a system having a plurality of processors 1 to M and each processor has corresponding output registers 1 to N an apparatus and method to transfer is claimed. The data comprises a current group of data and a next group of data. Each group of data comprises a plurality of portions of data. The current group of data from each processor 1 to M is transferred to its corresponding output register 1 to N. Each processor then receives and processes the next group of data. Simultaneously, the portion of data from output register N to output register N-1 is transferred. Similarly, each portion of data from output register N-1 is transferred to output register N-2, and so on. The portion of data from register 1 is transferred to a frame buffer.

27 Claims, 6 Drawing Sheets

APPARATUS AND METHOD FOR CONSOLIDATING OUTPUT DATA FROM A PLURALITY OF PROCESSORS

This application claims the benefit of priority of the U.S. Provisional Patent Application Ser. No. 60/291,467, filed May 16, 2001, U.S. patent application Ser. No. 09/876,787 entitled, "Apparatus And Method For Decoding And Computer A Discrete Cosine Transform Using A Butterfly Processor," filed Jun. 6, 2001 now U.S. Pat. No. 6,870,885, and U.S. patent application Ser. No. 09/876,789 entitled, "Apparatus And Method For Encoding And Computing A Discrete Cosine Transform Using A Butterfly Processor," filed Jun. 6, 2001 now U.S. Pat. No. 6,876,704, which are incorporated herein by reference in their entirety. The present invention relates to digital signal processing. More specifically, the present invention relates to an apparatus and method for efficiently consolidating output processor data.

BACKGROUND OF THE INVENTION

I. Field of the Invention

II. Description of the Related Art

Digital picture processing has a prominent position in the general discipline of digital signal processing. The importance of human visual perception has encouraged tremendous interest and advances in the art and science of digital picture processing. In the field of transmission and reception of video signals, such as those used for projecting films or movies, various improvements are being made to image compression techniques. Many of the current and proposed video systems make use of digital encoding techniques. Aspects of this field include image coding, image restoration, and image feature selection. Image coding represents the attempts to transmit pictures of digital communication channels in an efficient manner, making use of as few bits as possible to minimize the band width required, while at the same time, maintaining distortions within certain limits. Image restoration represents efforts to recover the true image of the object. The coded image being transmitted over a communication channel may have been distorted by various factors. Source of degradation may have arisen originally in creating the image from the object. Feature selection refers to the selection of certain attributes of the picture. Such attributes may be required in the recognition, classification, and decision in a wider context.

Digital encoding of video, such as that in digital cinema, is an area which benefits from improved image compression techniques. Digital image compression may be generally classified into two categories: loss-less and lossy methods. A loss-less image is recovered without any loss of information. A lossy method involves an irrecoverable loss of some information, depending upon the compression ratio, the quality of the compression algorithm, and the implementation of the algorithm. Generally, lossy compression approaches are considered to obtain the compression ratios desired for a cost-effective digital cinema approach. To achieve digital cinema quality levels, the compression approach should provide a visually loss-less level of performance. As such, although there is a mathematical loss of information as a result of the compression process, the image distortion caused by this loss should be imperceptible to a viewer under normal viewing conditions.

Existing digital image compression technologies have been developed for other applications, namely for television systems. Such technologies have made design compromises appropriate for the intended application, but do not meet the quality requirements needed for cinema presentation.

Digital cinema compression technology should provide the visual quality that a moviegoer has previously experienced. Ideally, the visual quality of digital cinema should attempt to exceed that of a high-quality release print film. At the same time, the compression technique should have high coding efficiency to be practical. As defined herein, coding efficiency refers to the bit rate needed for the compressed image quality to meet a certain qualitative level. Moreover, the system and coding technique should have built-in flexibility to accommodate different formats and should be cost effective; that is, a small-sized and efficient decoder or encoder process.

One compression technique capable of offering significant levels of compression while preserving the desired level of quality utilizes adaptively sized blocks and sub-blocks of encoded Discrete Cosine Transform (DCT) coefficient data. Although DCT techniques are gaining wide acceptance as a digital compression method, efficient hardware implementation has been difficult.

SUMMARY OF THE INVENTION

Embodiments of the invention efficiently implement frequency based transform techniques. In a system having a plurality of processors 1 to M and each processor has corresponding output registers 1 to N an apparatus and method to transfer is claimed. The data comprises a current group of data and a next group of data. Each group of data comprises a plurality of portions of data. The current group of data from each processor 1 to M is transferred to its corresponding output register 1 to N. Each processor then receives and processes the next group of data. Simultaneously, the portion of data from output register N to output register N-1 is transferred. Similarly, each portion of data from output register N-1 is transferred to output register N-2, and so on. The portion of data from register 1 is transferred to a frame buffer.

In an alternate embodiment, a system having a plurality of processors 1 to M where each processor has a corresponding output register 1 to N is configurable to receive and transfer data. An inverse transform of a block of encoded data, where the block of encoded data has current group of data and a next group of data and where each group comprises a plurality of data elements, may be performed in such a system. A predetermined quantity of data elements is received. At least one mathematical operation is performed on selected pairs of data elements to produce an output of processed data elements. A determination is made as to whether any of the processed data elements require additional mathematical operations. A first portion of processed data elements that require additional mathematical operations is selected and separated from a second portion of processed data elements that do not require additional mathematical operations. At least one mathematical operation is performed on selected pairs of the first portion of processed data elements to produce a second output of processed data elements. The second portion of processed data elements is stored until all of the first portion of data elements is processed. This iterative process is repeated until all portions of the data are processed.

The current group of data from each processor 1 to M is then transferred to its corresponding output register 1 to N. the next group of data is received and processed within each processor in the manner described above. Simultaneously, the portion of data from output register N is transferred to output register N-1. Similarly, the portion of data from output register N-1 is transferred to output register N-2, and so on. The portion of data from the first register is transferred to a frame buffer interface. Further the output register may be configured to saturate the processed data from a seventeen bit format to a ten bit format.

The invention provides for efficient hardware implementation of adaptive block sized DCT encoded data.

Accordingly, it is an aspect of an embodiment to consolidate outputs from a plurality of processors.

It is another aspect of an embodiment to minimize the quantity of large capacity data buses on an integrated circuit.

It is another aspect of an embodiment to scale the representation of image data to a scale acceptable in the pixel domain.

It is another aspect of an embodiment to output a current group of processed encoded data using a daisy chain architecture while processing a next group of encoded data simultaneously.

BRIEF DESCRIPTION OF THE DRAWINGS

The aspects, features, objects, and advantages of the invention will become more apparent from the detailed description set forth below when taken in conjunction with the drawings in which like reference characters identify correspondingly throughout and wherein:

FIG. 2C is a block diagram illustrating the processing steps involved in variance based block size assignment;

DETAILED DESCRIPTION OF THE PREFERRED EMBODIMENTS

Figure 1A:
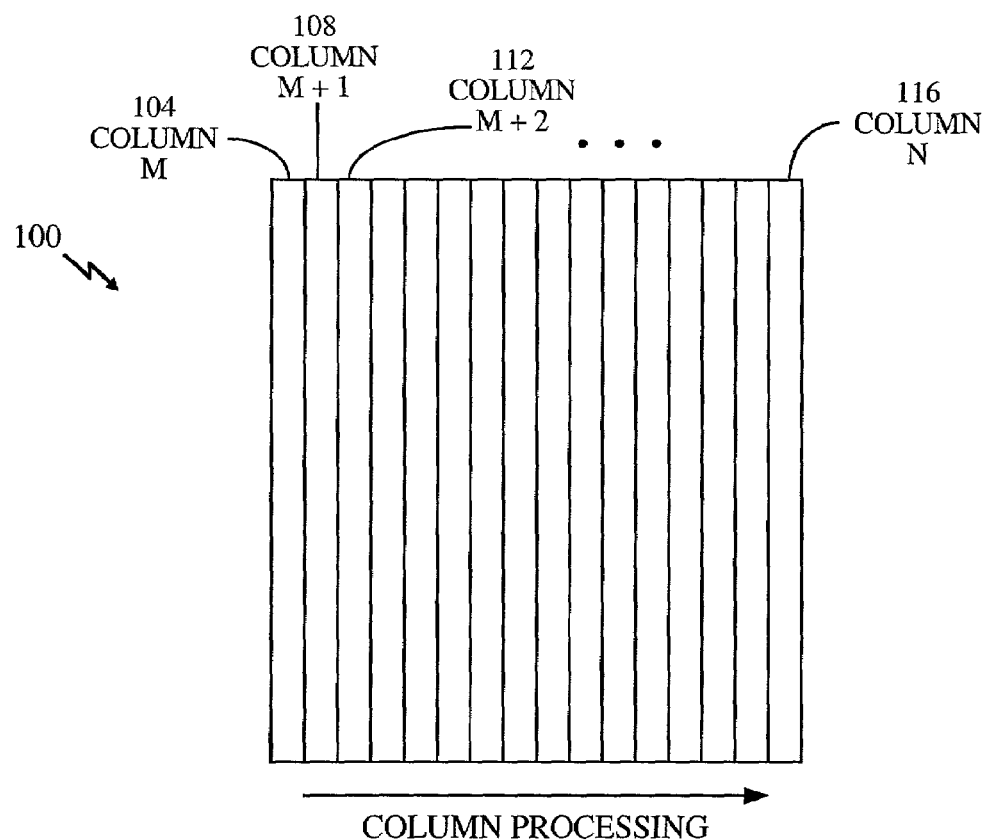
FIG. 1 is a block diagram of column and row processing of a block of data.

In order to facilitate digital transmission of digital signals and enjoy the corresponding benefits, it is generally necessary to employ some form of signal compression. To achieve high definition in a resulting image, it is also important that the high quality of the image be maintained. Furthermore, computational efficiency is desired for compact hardware implementation, which is important in many applications.

Accordingly, spatial frequency-domain techniques, such as Fourier transforms, wavelet, and discrete cosine transforms (DCT) generally satisfy the above criteria. The DCT has energy packing capabilities and approaches a statistical optimal transform in decorellating a signal. The development of various algorithms for the efficient implementation of DCT further contributes to its mainstream applicability. The reduction and computational complexity of these algorithms and its recursive structure results in a more simplified hardware scheme. DCTs are generally orthogonal and separable. The fact that DCTs are orthogonal implies that the energy, or information, of a signal is preserved under transformation; that is, mapping into the DCT domain. The fact that DCTs are separable implies that a multidimensional DCT may be implemented by a series of one-dimensional transforms. Accordingly, faster algorithms may be developed for one-dimensional DCTs and be directly extended to multidimensional transforms.

In a DCT, a block of pixels is transformed into a same-size block of coefficients in the frequency domain. Essentially, the transform expresses a block of pixels as a linear combination of orthogonal basis images. The magnitudes of the coefficients express the extent to which the block of pixels and the basis images are similar.

Generally, an image to be processed in the digital domain is composed of pixel data divided into an array of non-overlapping blocks, N×N in size. A two-dimensional DCT may be performed on each block. The two-dimensional DCT is defined by the following relationship:

$$X(k, l) = \frac{\alpha(k)\beta(l)}{N} \sum_{m=0}^{N-1} \sum_{n=0}^{N-1} x(m, n) \cos\left[\frac{(2m+1)\pi k}{2N}\right] \cos\left[\frac{(2n+1)\pi l}{2N}\right],$$

$$0 \leq k, l \leq N-1 \text{ where}$$

$$\alpha(k), \beta(k) = \begin{cases} 1, & \text{if } k = 0 \\ \sqrt{2}, & \text{if } k \neq 0 \end{cases}, \text{ and}$$

x(m,n) is the pixel location (m,n) within an N×M block, and

X(k,l) is the corresponding DCT coefficient.

Since pixel values are non-negative, the DCT component X(0,0) is always positive and usually has the most energy. In fact, for typical images, most of the transform energy is concentrated around the component X(0,0). This energy compaction property makes the DCT technique such an attractive compression method.

It has been observed that most natural images are made up of flat relatively slow varying areas, and busy areas such as object boundaries and high-contrast texture. Contrast adaptive coding schemes take advantage of this factor by assigning more bits to the busy areas and fewer bits to the less busy areas. This technique is disclosed in U.S. Pat. No. 5,021,891, entitled "Adaptive Block Size Image Compression Method and System," assigned to the assignee of the present invention and incorporated herein by reference. DCT techniques are also disclosed in U.S. Pat. No. 5,107,345, entitled "Adaptive Block Size Image Compression Method And System," assigned to the assignee of the present invention and incorporated herein by reference. Further, the use of the ABSDCT technique in combination with a Differential Quadtree Transform technique is discussed in U.S. Pat. No. 5,452,104, entitled "Adaptive Block Size Image Compression Method And System," also assigned to the assignee of the present invention and incorporated herein by reference. The systems disclosed in these patents utilizes what is referred to as "intra-frame" encoding, where each frame of image data is encoded without regard to the content of any other frame. Using the ABSDCT technique, the achievable data rate may be greatly reduced without discernible degradation of the image quality.

Using ABSDCT, a video signal will generally be segmented into frames and blocks of pixels for processing. The DCT operator is one method of converting a time-sampled signal to a frequency representation of the same signal. By converting to a frequency representation, DCT techniques have been shown to allow for very high levels of compression, as quantizers can be designed to take advantage of the frequency distribution characteristics of an image. In a preferred embodiment, one 16×16 DCT is applied to a first ordering, four 8×8 DCTs are applied to a second ordering, 16 4×4 DCTs are applied to a third ordering, and 64 2×2 DCTs are applied to a fourth ordering.

For image processing purposes, the DCT operation is performed on pixel data that is divided into an array of non-overlapping blocks. Note that although block sizes are discussed herein as being N×N in size, it is envisioned that various block sizes may be used. For example, an N×M block size may be utilized where both N and M are integers with M being either greater than or less than N. Another important aspect is that the block is divisible into at least one level of sub-blocks, such as N/i×N/i, N/i×N/j, N/i×M/j, and etc. where i and j are integers. Furthermore, the exemplary block size as discussed herein is a 16×16 pixel block with corresponding block and sub-blocks of DCT coefficients. It is further envisioned that various other integers such as both even or odd integer values may be used, e.g., 9×9.

A color signal may be converted from RGB space to $YC_1C_2$ space, with Y being the luminance, or brightness, component, and $C_1$ and $C_2$ being the chrominance, or color, components. Because of the low spatial sensitivity of the eye to color, many systems sub-sample the $C_1$ and $C_2$ components by a factor of four in the horizontal and vertical directions. However, the sub-sampling is not necessary. A full resolution image, known as 4:4:4 format, may be either very useful or necessary in some applications such as those referred to as covering digital cinema. Two possible $YC_1C_2$ representations are, the YIQ representation and the YUV representation, both of which are well known in the art. It is also possible to employ a variation of the YUV representation known as YCbCr.

Figure 1B:
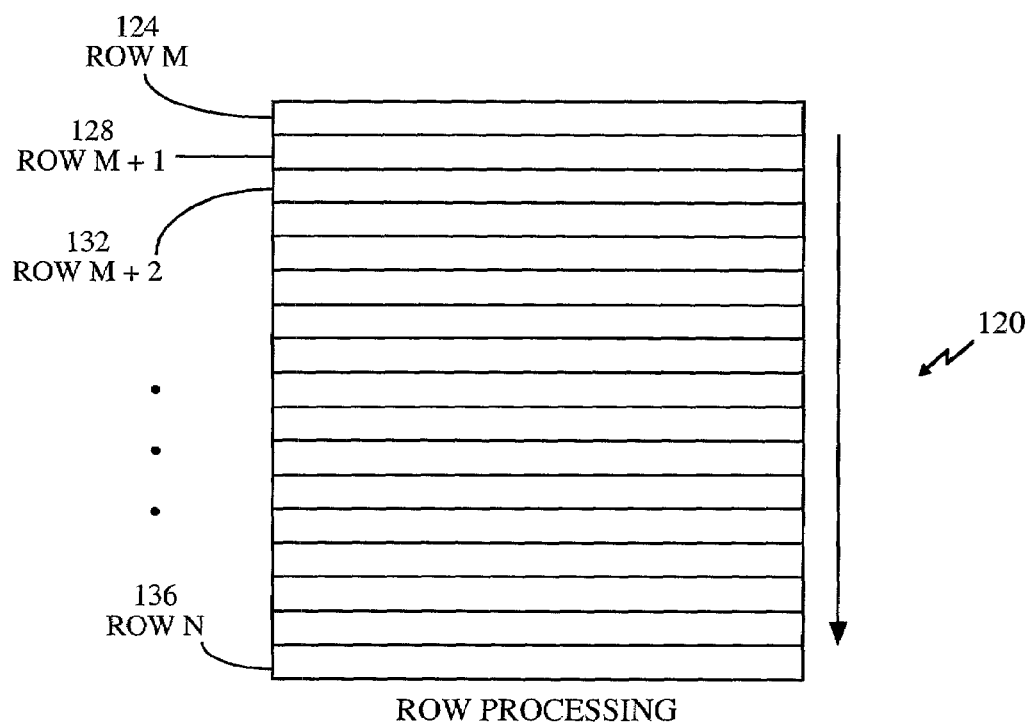

FIGS. 1A and 1B illustrate column and row processing of a N×N block of encoded data 100 and 120. An N dimensional transform may be performed as a cascade of N one-dimensional transforms. For example, a 2×2 DCT is performed as a cascade of two one-dimensional DCT processes, first operating on each column and then operating on each row. A first column m (104) is processed, followed by column m+1 (108), followed by column m+2 (112), and so on through column n (116). After the columns are processed, the rows 120 are processed as illustrated in FIG. 1B. First, row m (124) is processed, followed by row m+1 (128), row m+2 (132) and so on through row n (136).

Similarly, another example may be an 8×8 block of data needing IDCT processing. The 8×8 block may be broken into four two-dimensional IDCTs. Each two-dimensional IDCT may then be processed in the same manner with respect to the two-dimensional DCT described with respect to FIGS. 1A and 1B.

Figure 2A:
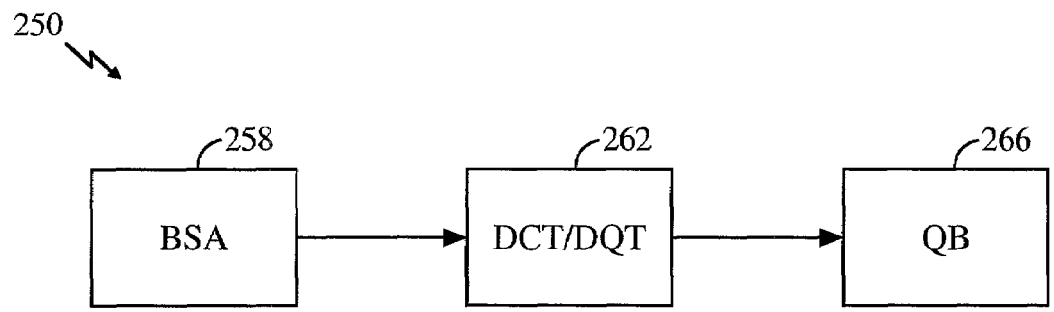
FIG. 2A is a block diagram illustrating the flow of data through an encoding process.
Figure 2B:
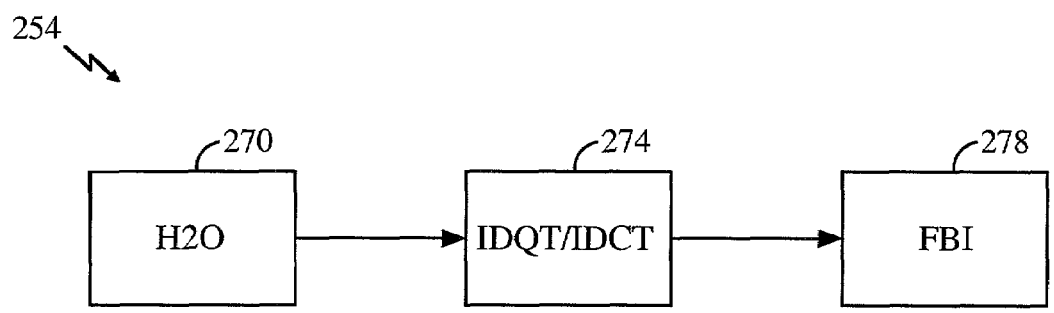
FIG. 2B is a flow diagram illustrating the flow of data through a decoding process.

FIG. 2A illustrates a block diagram 250 of the flow of encoded data during an encoding process. In the encoding process, encoded data is transformed from the pixel domain to the frequency domain. FIG. 2B illustrates a block diagram 254 of the flow of encoded data through a decoding process. In the decoding process, encoded data is transformed from the frequency domain to the pixel domain. As illustrated in the encode process 250, a block sized assignment (BSA) of the encoded data is first performed (258). In an aspect of an embodiment, each of the Y, Cb, and Cr components is processed without sub-sampling. Thus, an input of a 16×16 block of pixels is provided to the block size assignment element 258, which performs block size assignment in preparation for video compression.

The block size assignment element 258 determines the block decomposition of a block based on the perceptual characteristics of the image in the block. Block size assignment subdivides each 16×16 block into smaller blocks in a quad-tree fashion depending on the activity within a 16×16 block. The block size assignment element 258 generates a quad-tree data, called the PQR data, whose length can be between 1 and 21 bits. Thus, if block size assignment determines that a 16×16 block is to be divided, the R bit of the PQR data is set and is followed by four additional bits of Q data corresponding to the four divided 8×8 blocks. If block size assignment determines that any of the 8×8 blocks is to be subdivided, then four additional bits of P data for each 8×8 block subdivided are added.

Data is divided into block sizes, such as 2×2, 4×4, 8×8, and 16×16. An encode data processor then performs a transform (DCT/DQT) of the encoded data (262), as is described with respect to FIG. 3. After the DCT/DQT process 262 is completed, a quantization process (QB) 266 is performed on the encoded data. This completes transformation of encoded data from the pixel domain to the frequency domain.

In an embodiment, the DCT coefficients are quantized using frequency weighting masks (FWMs) and a quantization scale factor. A FWM is a table of frequency weights of the same dimensions as the block of input DCT coefficients. The frequency weights apply different weights to the different DCT coefficients. The weights are designed to emphasize the input samples having frequency content that the human visual system is more sensitive to, and to de-emphasize samples having frequency content that the visual system is less sensitive to. The weights may also be designed based on factors such as viewing distances, etc.

Huffman codes are designed from either the measured or theoretical statistics of an image. It has been observed that most natural images are made up of blank or relatively slowly varying areas, and busy areas such as object boundaries and high-contrast texture. Huffman coders with frequency-domain transforms such as the DCT exploit these features by assigning more bits to the busy areas and fewer bits to the blank areas. In general, Huffman coders make use of look-up tables to code the run-length and the non-zero values.

The weights are selected based on empirical data. A method for designing the weighting masks for 8×8 DCT coefficients is disclosed in ISO/IEC JTC1 CD 10918, "Digital compression and encoding of continuous-tone still images—part 1: Requirements and guidelines," International Standards Organization, 1994, which is herein incorporated by reference. In general, two FWMs are designed, one for the luminance component and one for the chrominance components. The FWM tables for block sizes 2×2, 4×4 are obtained by decimation and 16×16 by interpolation of that for the 8×8 block. The scale factor controls the quality and bit rate of the quantized coefficients.

Thus, each DCT coefficient is quantized according to the relationship:

$$DCT_q(i, j) = \left\lfloor \frac{8 * DCT(i, j)}{fwm(i, j) * q} \pm \frac{1}{2} \right\rfloor$$

where DCT(i,j) is the input DCT coefficient, fwm(i,j) is the frequency weighting mask, q is the scale factor, and DCTq (i,j) is the quantized coefficient. Note that depending on the sign of the DCT coefficient, the first term inside the braces is rounded up or down. The DQT coefficients are also quantized using a suitable weighting mask. However, multiple tables or masks can be used, and applied to each of the Y, Cb, and Cr components.

The quantized coefficients are provided to a zigzag scan serializer 268. The serializer 268 scans the blocks of quantized coefficients in a zigzag fashion to produce a serialized stream of quantized coefficients. A number of different zigzag scanning patterns, as well as patterns other than zigzag may also be chosen. A preferred technique employs 8×8 block sizes for the zigzag scanning, although other sizes, such as 4×4 or 16×16, may be employed.

Note that the zigzag scan serializer 268 may be placed either before or after the quantizer 266. The net results are the same.

In any case, the stream of quantized coefficients is provided to a variable length coder 269. The variable length coder 269 may make use of run-length encoding of zeros followed by encoding. This technique is discussed in detail in aforementioned U.S. Pat. Nos. 5,021,891, 5,107,345 and 5,452,104, and in pending U.S. patent application Ser. No. 09/634,666, filed Aug. 8, 2000, which is incorporated by reference and is summarized herein. A run-length coder takes the quantized coefficients and notes the run of successive coefficients from the non-successive coefficients. The successive values are referred to as run-length values, and are encoded. The non-successive values are separately encoded. In an embodiment, the successive coefficients are zero values, and the non-successive coefficients are non-zero values. Typically, the run length is from 0 to 63 bits, and the size is an AC value from 1–10. An end of file code adds an additional code—thus, there is a total of 641 possible codes.

In the decoding process, encoded data in the frequency domain is converted back into the pixel domain. A variable length decoder 270 produces a run-length and size of the data and provides the data to an inverse zigzag scan serializer 271 that orders the coefficients according to the scan scheme employed. The inverse zigzag scan serializer 271 receives the PQR data to assist in proper ordering of the coefficients into a composite coefficient block. The composite block is provided to an inverse quantizer 272, for undoing the processing due to the use of the frequency weighting masks.

A finger printer (H2O) 273 is then performed on the encoded data. The finger printer places a watermark or other identifier information on the data. The watermark may be recovered at a later time, to reveal identifier information. Identifier information may include information such as where and when material was played, and who was authorized to play such material. Following the finger printer 273, a decoder data process 274 (IDQT/IDCT) is commenced, which is described in detail with respect to FIG. 4. After the data is decoded, the data is sent to the Frame Buffer Interface (FBI) 278. The FBI is configured to read and write uncompressed data a frame at a time. In an embodiment, the FBI has a capacity of four frames, although it is contemplated that the storage capacity may be varied.

Referring now to FIG. 2C, a flow diagram showing details of the operation of the block size assignment element 258 is provided. The algorithm uses the variance of a block as a metric in the decision to subdivide a block. Beginning at step 202, a 16×16 block of pixels is read. At step 204, the variance, v16, of the 16×16 block is computed. The variance is computed as follows:

$$\text{var} = \frac{1}{N^2}\sum_{i=0}^{N-1}\sum_{j=0}^{N-1} x_{i,j}^2 - \left(\frac{1}{N^2}\sum_{i=0}^{N-1}\sum_{j=0}^{N-1} x_{i,j}\right)^2$$

where N=16, and $x_{i,j}$ is the pixel in the $i^{th}$ row, $j^{th}$ column within the N×N block. At step 206, first the variance threshold T16 is modified to provide a new threshold T'16 if the mean value of the block is between two predetermined values, then the block variance is compared against the new threshold, T'16.

If the variance v16 is not greater than the threshold T16, then at step 208, the starting address of the 16×16 block is written, and the R bit of the PQR data is set to 0 to indicate that the 16×16 block is not subdivided. The algorithm then reads the next 16×16 block of pixels. If the variance v16 is greater than the threshold T16, then at step 210, the R bit of the PQR data is set to 1 to indicate that the 16×16 block is to be subdivided into four 8×8 blocks.

The four 8×8 blocks, i=1:4, are considered sequentially for further subdivision, as shown in step 212. For each 8×8 block, the variance, $v8_i$, is computed, at step 214. At step 216, first the variance threshold T8 is modified to provide a new threshold T'8 if the mean value of the block is between two predetermined values, then the block variance is compared to this new threshold.

If the variance $v8_i$ is not greater than the threshold T8, then at step 218, the starting address of the 8×8 block is written, and the corresponding Q bit, $Q_i$, is set to 0. The next 8×8 block is then processed. If the variance $v8_i$ is greater than the threshold T8, then at step 220, the corresponding Q bit, $Q_i$, is set to 1 to indicate that the 8×8 block is to be subdivided into four 4×4 blocks.

The four 4×4 blocks, $j_i$=1:4, are considered sequentially for further subdivision, as shown in step 222. For each 4×4 block, the variance, $v4_{ij}$, is computed, at step 224. At step 226, first the variance threshold T4 is modified to provide a new threshold T'4 if the mean value of the block is between two predetermined values, then the block variance is compared to this new threshold.

If the variance $v4_{ij}$ is not greater than the threshold T4, then at step 228, the address of the 4×4 block is written, and the corresponding P bit, $P_{ij}$, is set to 0. The next 4×4 block is then processed. If the variance $v4_{ij}$ is greater than the threshold T4, then at step 230, the corresponding P bit, $P_{ij}$, is set to 1 to indicate that the 4×4 block is to be subdivided into four 2×2 blocks. In addition, the address of the 4 2×2 blocks is written.

The thresholds T16, T8, and T4 may be predetermined constants. This is known as the hard decision. Alternatively, an adaptive or soft decision may be implemented. The soft decision varies the thresholds for the variances depending on the mean pixel value of the 2N×2N blocks, where N can be 8, 4, or 2. Thus, functions of the mean pixel values, may be used as the thresholds.

For purposes of illustration, consider the following example. Let the predetermined variance thresholds for the Y component be 50, 1100, and 880 for the 16×16, 8×8, and 4×4 blocks, respectively. In other words, T16=50, T8=1100, and T16=880. Let the range of mean values be 80 and 100. Suppose the computed variance for the 16×16 block is 60. Since 60 and its mean value 90 are greater than T16, the 16×16 block is subdivided into four 8×8 sub-blocks. Suppose the computed variances for the 8×8 blocks are 1180, 935, 980, and 1210. Since two of the 8×8 blocks have variances that exceed T8, these two blocks are further subdivided to produce a total of eight 4×4 sub-blocks. Finally, suppose the variances of the eight 4×4 blocks are 620, 630, 670, 610, 590, 525, 930, and 690, with the first four corresponding means values 90, 120, 110, 115. Since the mean value of the first 4×4 block falls in the range (80, 100), its threshold will be lowered to T'4=200 which is less than 880. So, this 4×4 block will be subdivided as well as the seventh 4×4 block.

Note that a similar procedure is used to assign block sizes for the color components $C_1$ and $C_2$. The color components may be decimated horizontally, vertically, or both. Additionally, note that although block size assignment has been described as a top down approach, in which the largest block (16×16 in the present example) is evaluated first, a bottom up approach may instead be used. The bottom up approach will evaluate the smallest blocks (2×2 in the present example) first.

The PQR data, along with the addresses of the selected blocks, are provided to a DCT/DQT element 262. The DCT/DQT element 262 uses the PQR data to perform discrete cosine transforms of the appropriate sizes on the selected blocks. Only the selected blocks need to undergo DCT processing. The DQT is also used for reducing the redundancy among the DC coefficients of the DCTs. A DC coefficient is encountered at the top left corner of each DCT block. The DC coefficients are, in general, large compared to the AC coefficients. The discrepancy in sizes makes it difficult to design an efficient variable length coder. Accordingly, it is advantageous to reduce the redundancy among the DC coefficients. The DQT element performs 2-D DCTs on the DC coefficients, taken 2×2 at a time. Starting with 2×2 blocks within 4×4 blocks, a 2-D DCT is performed on the four DC coefficients. This 2×2 DCT is called the differential quad-tree transform, or DQT, of the four DC coefficients. Next, the DC coefficient of the DQT along with the three neighboring DC coefficients with an 8×8 block are used to compute the next level DQT. Finally, the DC coefficients of the four 8×8 blocks within a 16×16 block are used to compute the DQT. Thus, in a 16×16 block, there is one true DC coefficient and the rest are AC coefficients corresponding to the DCT and DQT.

Within a frame, each 16×16 block is computed independently. Accordingly, the processing algorithm used for a given block may be changed as necessary, as determined by the PQR.

Figure 3:
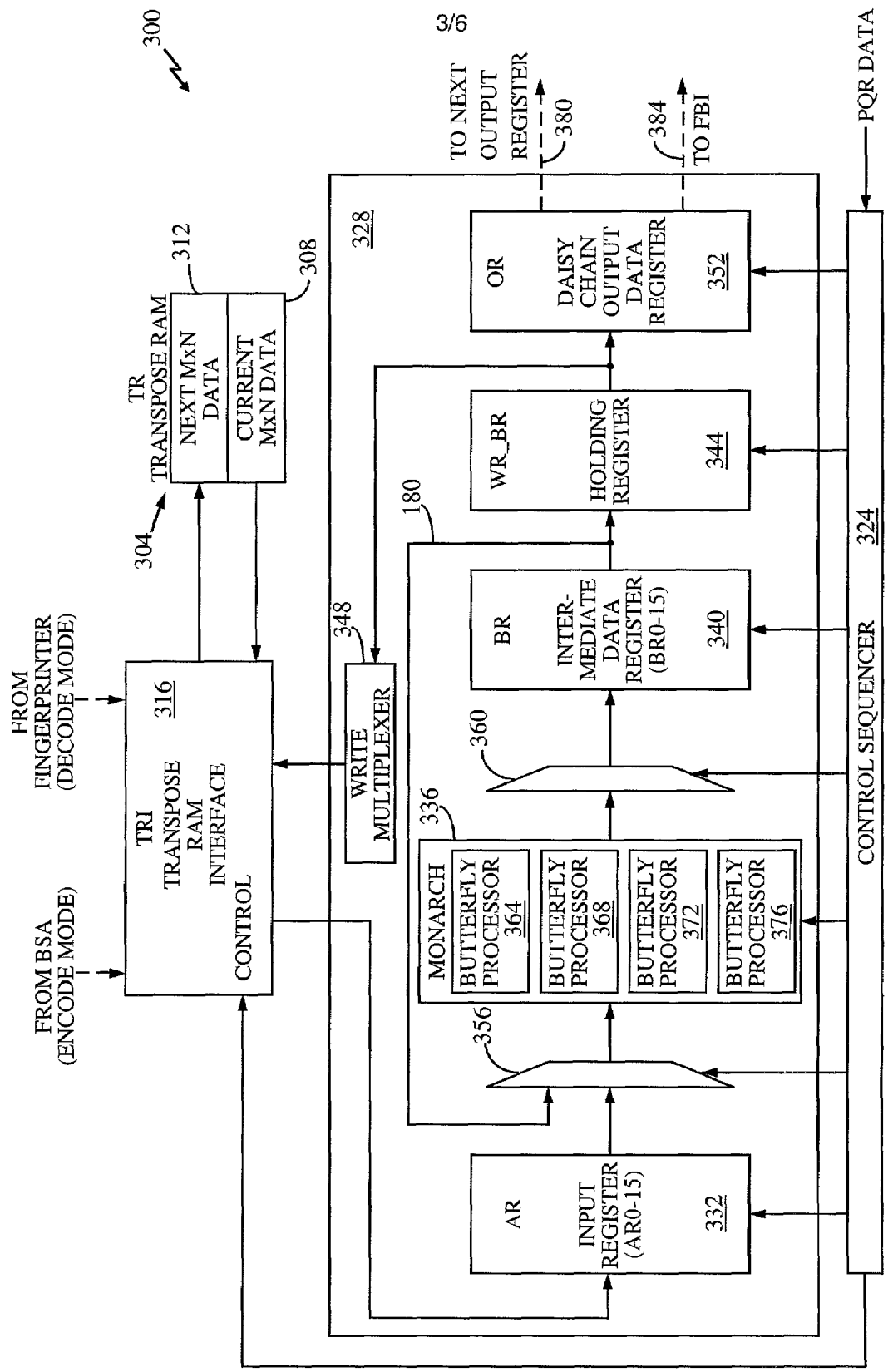
FIG. 3 is a block diagram illustrating a processor configurable to compute a transform, such as a discrete cosine transform (DCT) and a discrete quantization transform (DQT), an inverse discrete cosine transform (IDCT) and an inverse discrete quantization transform (IDQT)

FIG. 3 is a block diagram illustrating a processor 300 configurable to compute the DCT/DQT and the IDQT/IDCT of a block of encoded data. In an embodiment, six processors 300 operate in parallel. Based on speed requirements and space constraints, however, any number of processors may be employed. In encode mode, as illustrated in FIG. 3, the encoded data is initially in the pixel domain. As the encoded data is processed through intermediate steps, the encoded data is transformed into the frequency domain. In decode mode, the encoded data is initially in the frequency domain. As the encoded data is processed through intermediate steps, the encoded data is transformed into the pixel domain.

Referring to FIG. 3, at least one M×N block of encoded data is stored in a transpose RAM 304. The transpose RAM 304 may contain one or more blocks of M×N data. In an embodiment with two blocks of encoded data, one is configured to contain a current M×N block of data 308, and the other configured to contain a next block of M×N data 312. The blocks of data 308 and 312 are transferred to transpose RAM 304 from the block size assignment 208 as illustrated in FIG. 2A (in encode mode) or the fingerprinter 220 as illustrated in FIG. 2B (in decode mode). In an embodiment, the transpose RAM 304 may be a dual port RAM, such that a transpose RAM interface 316 processes the current block of data 308 and receives the next block of data from the fingerprinter 220. The transpose RAM interface 316 controls timing and may have buffered memory to allow blocks of data to be read from and written to the transpose RAM 304. In an embodiment, the transpose RAM 304 and transpose RAM interface 316 may be responsive to one or more control signals from a control sequencer 324.

Encoded data enters a data processor 328 from transpose RAM 304 (or through the transpose RAM interface 316) into one or more input registers 332. In an embodiment, there are 16 input registers 332. In an embodiment, the data processor 328 first processes column data, followed by row data, as illustrated in FIG. 1. The data processor 328 may alternatively process the rows followed by the columns, however, the following description assumes that column data is processed prior to row data. The input register 332 comprises of a single column encoded data of the 16×16 block. The data processor 328 computes the transform by performing mathematical operations on the encoded data, column by column, and writes the data back into the transpose RAM 304. After the columns of data are processed, the data processor 328 processes each row of encoded data. After each row of encoded data is processed, the data processor 328 outputs the data through an output register 352.

In an embodiment, the block of data is a 16×16 block of encoded data, although it is contemplated that any size block of data may be used, such as 32×32, 8×8, 4×4, or 2×2, or combinations thereof. Accordingly, as the data processor 328 is processing a block of data from the transpose RAM 304 (for example, the current M×N block of data 308), the transpose RAM interface 316 receives the next block of data 312 from the BSA 208 (encode mode) or the fingerprinter 220 (decode mode). When the data processor 328 has completed processing of the current block of data 308, the transpose RAM interface 316 reads the next block of data 312 from the transpose RAM 304 interface and loads it into data processor 328. As such, data from the transpose RAM 304 toggles between the current block of data 308 and the next block of data 312 as dictated by the transpose RAM interface 316 and the control sequencer 324.

The data processor 328 comprises input register 332, at least one butterfly processor within a monarch butterfly cluster 336 and at least one intermediate data register 340. Data processor 328 may also comprise a holding register 344, a write mutliplexer 348, and output data register 352. Monarch butterfly cluster 336 may further comprise a first input multiplexer 356, and intermediate data register 340 further comprises a second input multiplexer 360. The aforementioned components of data processor 328 are preferably controlled by the control sequencer 324.

In operation, for a given column or row of data, the input register 332 is configured to receive the encoded data through the transpose RAM interface 316 from the transpose RAM 304. The control sequencer 324 enables certain addresses of the input register to send the data through input multiplexer 356. The data input is resequenced as by selection through input multiplexer 356 such that the proper pairs of encoded data are selected for mathematical operations. Controlled by the control sequencer 324, the input multiplexer 356 passes the data to the monarch butterfly cluster 336. The monarch butterfly cluster 336 comprises one or more butterfly processors. In an embodiment, the monarch butterfly cluster 336 comprises four individual butterfly processors 364, 368, 372, and 376, and control sequencer 324 routes encoded data through input multiplexer 356 to the appropriate butterfly processor.

Each individual butterfly processor 364, 368, 372 or 376 is capable of performing one-dimensional transforms, such as the DCT, IDCT, DQT and IDQT. A one-dimensional transform typically involve arithmetic operations, such as simple adders, subtractors, or a multiplier. After a portion of a one-dimensional transform is performed on a pair of data elements, the resulting output is transferred to the intermediate data register 340. Intermediate data register 340 may be responsive to the control sequencer 324. The control sequencer may be a device such as a state machine, a microcontroller, or a programmable processor. In an embodiment in which the intermediate data register 340 is responsive to the control sequencer 324, selected data elements stored in the intermediate data register 340 are fed back to appropriate butterfly processor using a feedback path 380 and through first input multiplexer 356, to be processed again (i.e., another portion of a one-dimensional transform). This feedback loop continues until all one-dimensional processing for the encoded data is completed. When the processing of the data is completed, the data from the intermediate data register 340 is written to the WRBR holding register 344. If the data being processed is column data, the data is written from the WRBR holding register 344 through the write multiplexer 348 and stored back into the transpose RAM 304, so that row processing may begin. The write multiplexer 348 is controlled to resequence the processed column data back into its original sequence. If the holding register data is row data (and thus, all of the column processing is complete), the data is routed to the output register 352. The control sequencer 324 may then control output of data from the daisy chain multiplexer and output data register 352. Output data register 352 then routes the row data to another output data register 380, or routes the data to the frame buffer interface 384.

Figure 4:
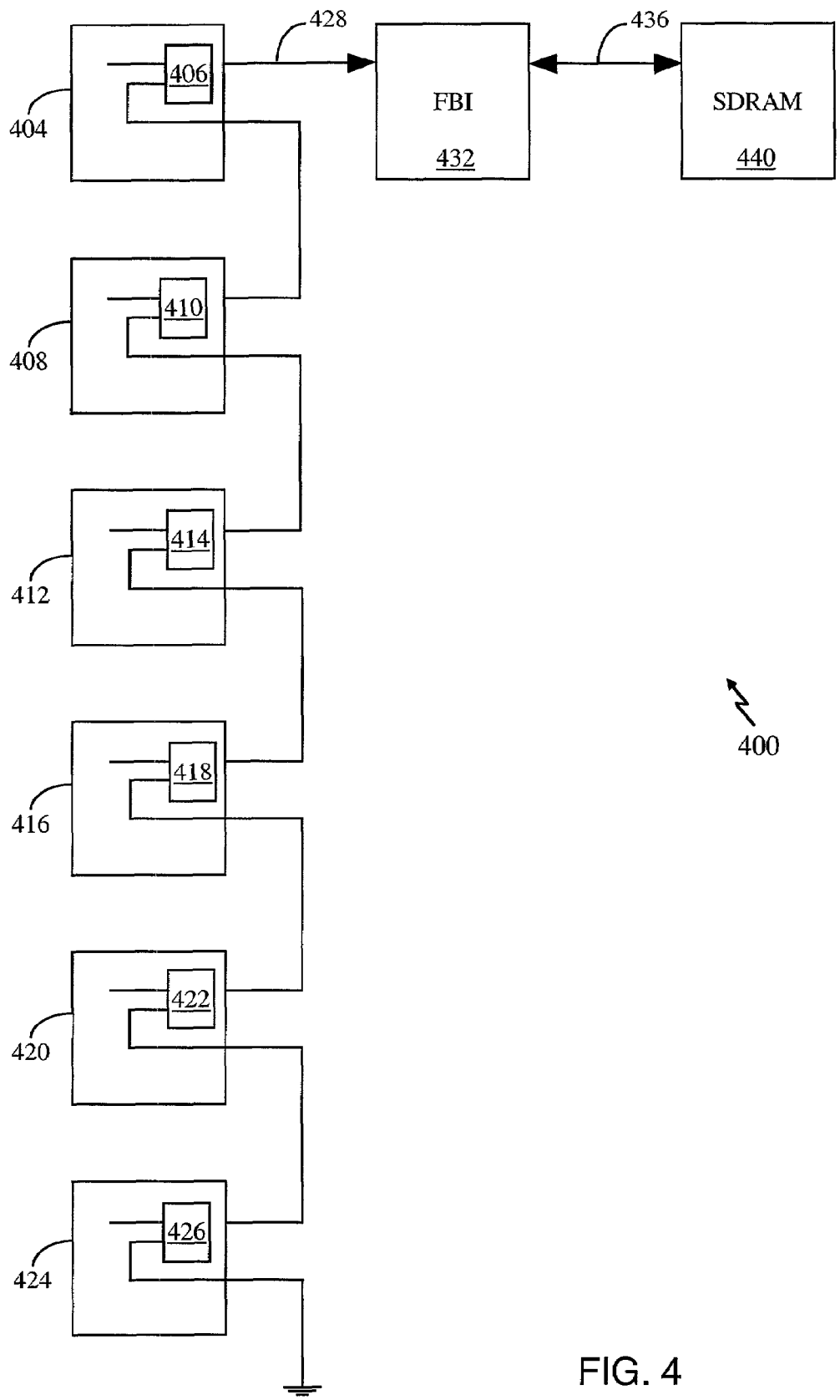
FIG. 4; is a block diagram illustrating a daisy chain architecture of a plurality of processors.

FIG. 4 illustrates a daisy chain architecture of output registers of a plurality of processors 400, each processor operating in the manner as described with respect to FIG. 1. In an embodiment, six processors 404, 408, 412, 416, 420 and 424 are coupled in a daisy-chain fashion, thereby interconnecting output registers 406, 410, 414, 418, 422 and 426, respectively. It is contemplated that any number of processors may be interconnected in this fashion, based upon space and speed requirements. The data in output register 406 is transferred using data bus 428 to frame buffer interface (FBI) 432, which in turn, is transferred using data bust 436 to SDRAM 440. Using such a daisy chain architecture only requires the space of a single 160 bit data bus (data bus 428). Without using a daisy chain architecture, 160 bit wide data buses would have had to be used to connect each processor 404, 408, 412, 416, 420 and 424 to FBI 432. 160 bit wide data buses consume significant space in application specific integrated circuits (ASICs). Further, additional buffers would be necessary to store the additional data. Accordingly, use of such a daisy chain architecture saves time and hardware space. In an embodiment, data bus 428 is a 160 bit wide data bus, and data bus 436 is an 80 bit wide data bus. Therefore, it takes twice as long (two clock cycles) to transfer data from FBI 432 to SDRAM 440 as it does for the data to transfer from processor 406 to FBI 432.

By connecting output registers 406, 410, 414, 418, 422 and 426, the data of, for example, processor 424 is transferred from output register 426 to the output register 422 of processor 420. In a following clock cycle, the data is transferred to output register 418, and so on, until reaching output register 406 of processor 404. Upon receipt of a control signal from the control sequencer, the data is then transferred to FBI 432. Thus, the path of data resident in processor 424 to FBI 432 goes through the other five intermediate processors. Requiring such a daisy chain data path minimizes space required on the chip, since use of six, direct 160 bit wide buses is avoided and replaced with a single, 160 bit wide data bus.

Further, the delay introduced by routing data in the output registers through successive output registers does not compromise speed performance. Transfer of data from the output registers of successive processors is done in parallel with internal butterfly processing of the next group of data for each processor. In other words, while the output registers of each of the processors is transferring a row of data up the daisy chain sequence, each processor is going through the iterative process of computing portions of one dimensional transforms on the next row of data, until a one dimensional transform is complete.

Figure 5A:
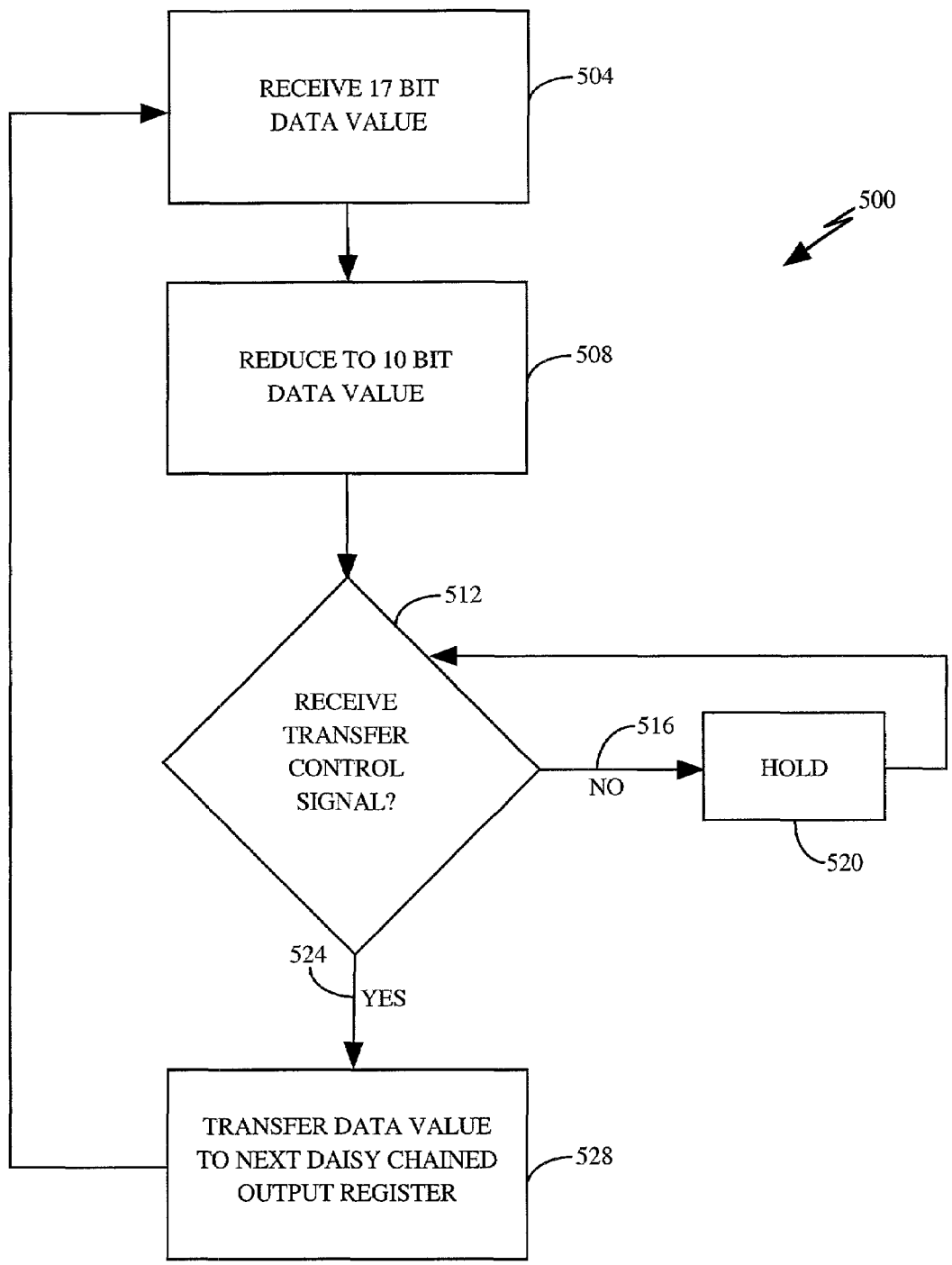
FIG. 5A is a flow chart illustrating operation of an output register.

FIG. 5A illustrates a process 500 of an output register, such as output registers 406, 410, 414, 418, 422 and 426 of FIG. 4. Seventeen bit data (one sign bit plus sixteen data bits) is received 504 and reduced 508 to ten bit data. In an embodiment, the seventeen bit value is saturated to be reduced to ten bit data. Because the eventual output is converted to pixel data representation, ten bit positive representation is needed. This is accomplished, essentially, by deleting the seven most significant bits. However, if the seventeen bit value is greater than 1023, the value is converted to 1023. If the seventeen bit value is less than 0, the value is converted to 0.

The output register is responsive 512 to a control signal. In an embodiment, the control signal is received from the control sequencer, as illustrated in FIG. 3. If a control signal is not received 516, the particular register continues to hold 520 the data. If and when the output register receives a transfer control signal 524, the ten bit data value is transferred 528 in a daisy chain fashion to the next output register of the next processor.

Figure 5B:
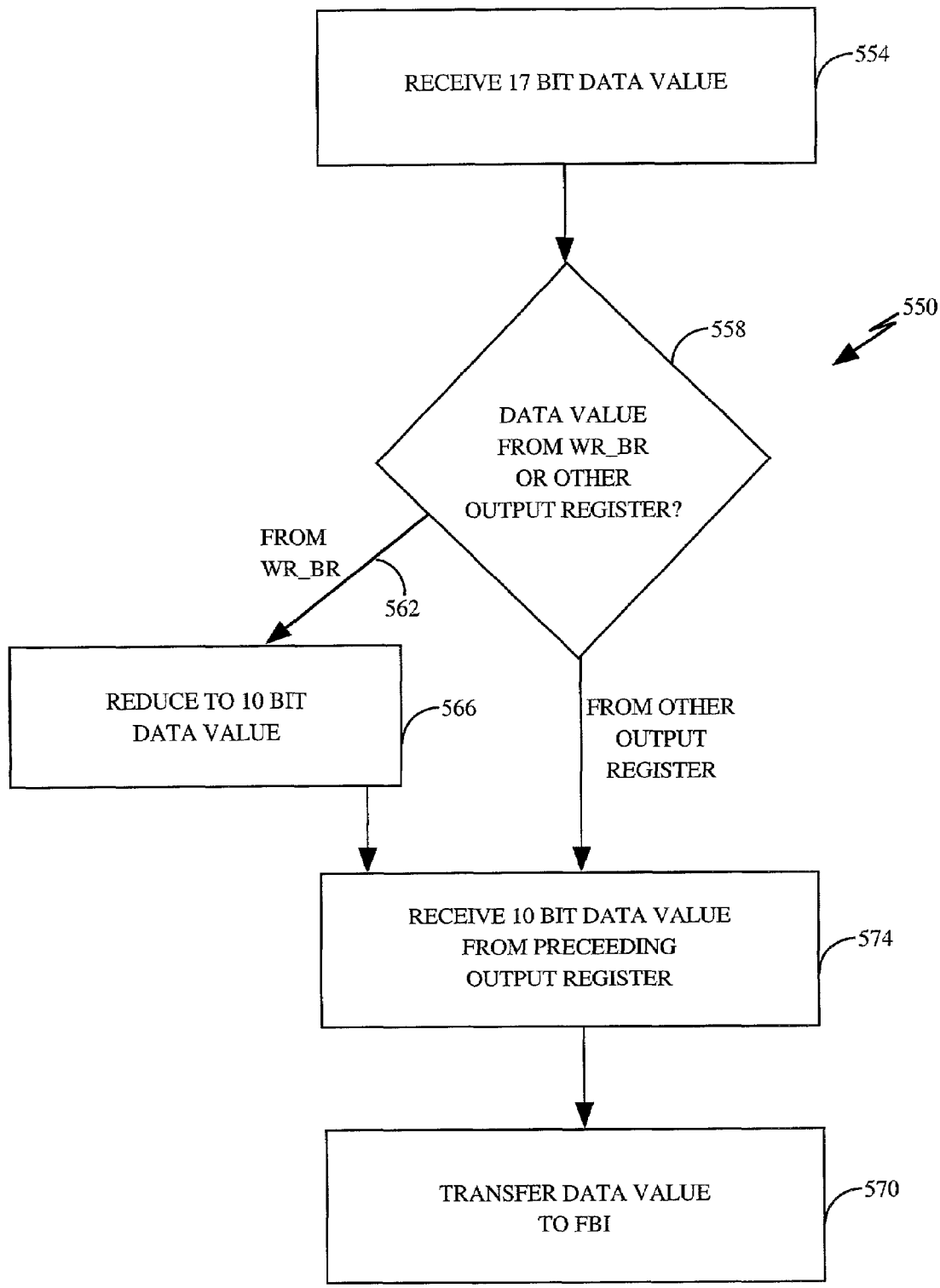
FIG. 5B is a flow chart illustrating operation of an alternate output register.

This process continues for each of the processors (for example, processors 408, 412, 416, 420 and 424 in FIG. 4), until reaching the processor that is coupled to the FBI (for example, processor 404 in FIG. 4). Operation 550 of output register 406 of processor 404 is illustrated in FIG. 5B. Similar to other output registers, seventeen bit data is received 554. A decision 558 is made as to whether data generated from processor 404 is to be transferred to the FBI, or if data daisy chained from another processor is to be transferred to the FBI. If the data to be transferred to the FBI is processor 404 generated data, the data is transferred 562 from the WR_BR register (as illustrated in FIG. 1) and reduced 566 to ten bit data in the same manner as described with respect to FIG. 5A. That data is then transferred 570 to the FBI, upon receipt of a control signal. In an alternate embodiment, the reduction to ten bit data 566 is done before decision 558.

If the data to be transferred to the FBI is from another processor, the data is received 574 from the preceeding output register in the daisy chain sequence (such as output register 410 in FIG. 4). That data is then transferred 570 to the FBI, upon receipt of a control signal. In an embodiment, the data output from each of the output registers represents a single row of data in a 16×16 block.

As examples, the various illustrative logical blocks, flowcharts, and steps described in connection with the embodiments disclosed herein may be implemented or performed in hardware or software with an application-specific integrated circuit (ASIC), a programmable logic device, discrete gate or transistor logic, discrete hardware components, such as, e.g., registers and FIFO, a processor executing a set of firmware instructions, any conventional programmable software and a processor, or any combination thereof. The processor may advantageously be a microprocessor, but in the alternative, the processor may be any conventional processor, controller, microcontroller, or state machine. The software could reside in RAM memory, flash memory, ROM memory, registers, hard disk, a removable disk, a CD-ROM, a DVD-ROM or any other form of storage medium known in the art.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What we claim as our invention is:

1. Apparatus to consolidate the output of data, the data comprising a plurality of data elements, the apparatus comprising:
    a plurality of processors, each processor comprising:
    an input register configured to receive a predetermined quantity of data elements;
    at least one butterfly processor coupled to the input register, the butterfly processor configured to perform at least one mathematical operation on selected pairs of data elements to produce an output of processed data elements;
    at least one intermediate register coupled to the butterfly processor, the intermediate register configured to temporarily store the processed data; and
    a feedback loop coupling the intermediate register and the butterfly processor, where if enabled, is configured to transfer a first portion of processed data elements to the appropriate butterfly processor to perform additional mathematical operations and, where if disabled, is configured to transfer a second portion of processed data elements to at least one holding register;
    wherein the holding register is configured to store the processed data until all of the first portion data elements is processed; and
    a plurality of output registers associated with the plurality of processors, wherein each output register is coupled to the holding register and another output register, each output register configured to receive the processed data from the holding register and route the processed data to an output register of a different processor.

2. The apparatus set forth in claim 1, further comprising at least one input multiplexer coupling the feedback loop and the intermediate register, wherein each input multiplexer is configured to temporarily select data elements and transfer data elements to the appropriate butterfly processor.

3. The apparatus set forth in claim 1, further comprising at least one output multiplexer coupling the butterfly processor and the intermediate register, wherein each output multiplexer is configured to temporarily select data elements and transfer data elements to the appropriate intermediate register.

4. The apparatus set forth in claim 1 wherein the block of encoded data may be represented as row data and column data, and further comprising a transpose random-access memory (RAM) coupled to the input register, wherein the transpose RAM is configured to store the row data while the column data is being processed, and wherein the transpose RAM is configured to store the column data while the row data is being processed.

5. The apparatus set forth in claim 4, wherein the transpose RAM is configurable to store two blocks of encoded data.

6. The apparatus set forth in claim 4, further comprising a write multiplexer coupling the holding register, wherein the write multiplexer is configured to resequence data elements to complete a one-dimensional transform.

7. The apparatus set forth in claim 1, wherein the data comprises a current group of data and a next group of data, the output registers are configured to operate on the current group of data simultaneous with the processor being configured to operate on a next group of data.

8. The apparatus set forth in claim 1, further comprising a control sequencer configured to control each processor.

9. The apparatus set forth in claim 8, where the control sequencer is configured to control each output register.

10. The apparatus as set forth in claim 1, wherein each butterfly processor performs a portion of a one-dimensional transform.

11. The apparatus set forth in claim 1, wherein each output register is configured to saturate the processed data from seventeen bits to ten bits.

12. In a system having a plurality of processors 1 to M, each processor having a corresponding output register configurable to receive and transfer data, the data comprising a current group of data and a next group of data, each group comprising a plurality of portions of data, a method to transfer data comprising:
    transferring the current group of data from each processor 1 to M to its corresponding output register;
    receiving and processing the next group of data within each processor; and
    simultaneously,
    transferring the portion of data from output register M to output register M-1, the portion of data from output register M-1 to output register M-2, and so on; and
    transferring the portion of data from register 1 to a frame buffer
    where M is 6.

13. In a system having a plurality of processors 1 to M, each processor having a corresponding output register configurable to receive and transfer data, a method to determine an inverse transform of a block of encoded data, the block of encoded data comprising a current group of data and a next group of data, each group comprising a plurality of data elements, the method comprising:
    (a) receiving a predetermined quantity of data elements;
    (b) performing at least one mathematical operation on selected pairs of data elements to produce an output of processed data elements;
    (c) making a determination as to whether any of the processed data elements require additional mathematical operations;
    (d) selecting a first portion of processed data elements that require additional mathematical operations;
    (e) selecting a second portion of processed data elements that do not require additional mathematical operations;
    (f) performing at least one mathematical operation on selected pairs of the first portion of processed data elements to produce a second output of processed data elements; and (g) storing the second portion of processed data elements until all of the first portion of data elements is processed;
(h) repeating steps (c), (d), (e), (f) and (g) as necessary until all portions of the data are processed;
(i) transferring the current group of data from each processor 1 to M its corresponding output register;
(j) receiving and processing the next group of data within each processor; and simultaneously to (i) and (j),
(k) transferring the portion of data from output register M to output register M-1, the portion of data from output register M-1 to output register M-2, and so on; and
(l) transferring the portion of data from register 1 to a frame buffer.

14. The method set forth in claim 13, wherein the transform is an Inverse Discrete Cosine Transform (IDCT) or an Inverse Differential Quadtree Transform (IDQT).

15. The method set forth in claim 13 wherein each group of data may be represented as row data and column data, and further comprising:
storing the row data while the column data is being processed; and
storing the column data while the row data is being processed.

16. The method set forth in claim 15, further comprising resequencing data elements before the step of storing, such that subsequent delivery of data elements is performed in an efficient manner.

17. The method set forth in claim 13, further comprising controlling each element (a)–(l) based upon predetermined criteria.

18. The method set forth in claim 17, further comprising providing a unique coefficient multiplier to certain data elements based upon predetermined criteria.

19. The method set forth in claim 18, wherein the unique coefficient multiplier is based on E. G. Lee's algorithm.

20. The method set forth in claim 13, wherein the mathematical operation is from the group consisting of addition, multiplication, and subtraction.

21. The method as set forth in claim 13, wherein each butterfly processor performs a portion of a one-dimensional transform.

22. The method as set forth in claim 13, wherein the transform of a block of encoded data is computed as a series of one-dimensional transforms.

23. The method as set forth in claim 13, where M is 6.

24. The method set forth in claim 13, further comprising (m) saturating each portion of the current group of data.

25. In a system having a plurality of processors 1 to M, each processor having a corresponding output register configurable to receive and transfer data, an apparatus to determine an inverse transform of a block of encoded data, the block of encoded data comprising a first group of data and a next group of data, each group comprising a plurality of data elements, the apparatus comprising:

(a) means for receiving a predetermined quantity of data elements;
(b) means for performing at least one mathematical operation on selected pairs of data elements to produce an output of processed data elements;
(c) means for making a determination as to whether any of the processed data elements require additional mathematical operations;
(d) means for selecting a first portion of processed data elements that require additional mathematical operations;
(e) means for selecting a second portion of processed data elements that do not require additional mathematical operations;
(f) means for performing at least one mathematical operation on selected pairs of the first portion of processed data elements to produce a second output of processed data elements; and
(g) means for storing the second portion of processed data elements until all of the first portion of data elements is processed;
(h) means for repeating steps (c), (d), (e), (f) and (g) all portions of the data are processed;
(i) means for transferring the current group of data from each processor 1 to M its corresponding output register;
(j) means for receiving and processing the next group of data within each processor; and simultaneous to (i) and (j),
(k) means for transferring the portion of data from output register M to output register M-1, the portion of data from output register M-1 to output register M-2, and so on; and
(l) means for transferring the portion of data from register 1 to a frame buffer.

26. The apparatus set forth in claim 25, wherein the transform is an Inverse Discrete Cosine Transform (IDCT) or an Inverse Differential Quadtree Transform (IDQT).

27. In a system having a plurality of processors 1 to M, each processor having a corresponding output register configurable to receive and transfer data, the data comprising a current group of data and a next group of data, each group comprising a plurality of portions of data, an apparatus configured to transfer data comprising:
means for transferring the current group of data from each processor 1 to M to its corresponding output register;
means for receiving and processing the next group of data within each processor; and
means for simultaneously transferring the portion of data from output register M to output register M-1, the portion of data from output register M-1 to output register M-2, and so on; and
means for transferring the portion of data from register 1 to a frame buffer, where M is 6.

* * * * *